US007022889B2

(12) United States Patent
Gillespie et al.

(10) Patent No.: US 7,022,889 B2
(45) Date of Patent: *Apr. 4, 2006

(54) ISOMERIZATION PROCESS USING NOVEL CATALYST

(75) Inventors: Ralph D. Gillespie, Gurnee, IL (US); Michelle J. Cohn, Glenview, IL (US); Lynn H. Rice, Arlington Heights, IL (US)

(73) Assignee: UOP LLC, Des Plaines, IL (US)

(*) Notice: Subject to any disclaimer, the term of this patent is extended or adjusted under 35 U.S.C. 154(b) by 54 days.

This patent is subject to a terminal disclaimer.

(21) Appl. No.: 10/804,358

(22) Filed: Mar. 19, 2004

(65) Prior Publication Data

US 2004/0249230 A1 Dec. 9, 2004

Related U.S. Application Data

(60) Continuation-in-part of application No. 10/717,812, filed on Nov. 20, 2003, now Pat. No. 6,881,873, and a continuation-in-part of application No. 10/718,050, filed on Nov. 20, 2003, now Pat. No. 6,927,188, said application No. 10/717,812 is a division of application No. 09/942,237, filed on Aug. 29, 2001, now Pat. No. 6,706,659, said application No. 10/718,050 is a continuation of application No. 09/942,237, filed on Aug. 29, 2001, now Pat. No. 6,706,659.

(51) Int. Cl.
*C07C 5/13* (2006.01)

(52) U.S. Cl. ....................................... 585/750; 585/751

(58) Field of Classification Search ................ 585/750, 585/751

See application file for complete search history.

(56) References Cited

U.S. PATENT DOCUMENTS

| | | | | |
|---|---|---|---|---|
| 2,939,896 | A | 6/1960 | Myers | 260/683.68 |
| 2,966,528 | A | 12/1960 | Haensel | 260/666 |
| 2,985,589 | A | 5/1961 | Broughton et al. | 210/34 |
| 3,040,777 | A | 6/1962 | Carson et al. | 137/625.15 |
| 3,175,444 | A | 3/1965 | Spinney | 83/251 |
| 3,422,848 | A | 1/1969 | Liebman et al. | 137/625.15 |
| 3,755,144 | A | 8/1973 | Asselin | 208/95 |
| 3,915,845 | A | 10/1975 | Antos | 208/139 |
| 4,003,826 | A | 1/1977 | Antos | 208/139 |
| 4,024,052 | A | 5/1977 | Antos | 208/139 |

(Continued)

OTHER PUBLICATIONS

Robert A. Meyers, The Handbook of Petroleum Refining Processes, 1986, 5-49 through 5-51.

*Primary Examiner*—Thuan D. Dang
(74) *Attorney, Agent, or Firm*—John G. Tolomei; Maryann Maas

(57) ABSTRACT

A process for the isomerization of a feedstream comprising $C_5$–$C_6$ hydrocarbons where the process involves charging hydrogen and a feedstream comprising at least normal $C_5$–$C_6$ hydrocarbons into an isomerization zone and contacting said hydrogen and feedstream with an isomerization catalyst at isomerization conditions to increase the branching of the feedstream hydrocarbons and produce an isomerization effluent stream comprising at least normal pentane, normal hexane, methylbutane, dimethylbutane, and methylpentane has been discovered. The catalyst used is a solid acid catalyst comprising a support comprising a sulfated oxide or hydroxide of at least an element of Group IVB (IUPAC 4) of the Periodic Table, a first component selected from the group consisting of at least one lanthanide-series element, mixtures thereof, and yttrium, and a second component selected from the group of platinum-group metals and mixtures thereof.

20 Claims, 8 Drawing Sheets

U.S. PATENT DOCUMENTS

| | | | | |
|---|---|---|---|---|
| 4,024,077 | A | 5/1977 | Engelhard et al. | 252/442 |
| 4,061,724 | A | 12/1977 | Grose et al. | 423/335 |
| 4,073,865 | A | 2/1978 | Flanigen et al. | 423/339 |
| 4,087,381 | A | 5/1978 | Antos | 252/441 |
| 4,310,440 | A | 1/1982 | Wilson et al. | 252/435 |
| 4,331,822 | A | 5/1982 | Onodera et al. | 585/482 |
| 4,440,871 | A | 4/1984 | Lok et al. | 502/214 |
| 4,485,185 | A | 11/1984 | Onodera et al. | 502/71 |
| 4,567,027 | A | 1/1986 | Detournay et al. | 423/101 |
| 4,567,029 | A | 1/1986 | Wilson et al. | 423/306 |
| 4,709,116 | A | 11/1987 | Zarchy et al. | 585/738 |
| 4,709,117 | A | 11/1987 | Gray, Jr. | 585/738 |
| 4,717,784 | A | 1/1988 | Stem et al. | 585/738 |
| 4,758,419 | A | 7/1988 | Lok et al. | 423/306 |
| 4,804,802 | A | 2/1989 | Evans et al. | 585/734 |
| 4,804,803 | A | 2/1989 | Schmidt et al. | 585/748 |
| 4,834,958 | A | 5/1989 | Zones | 423/277 |
| 4,899,012 | A | 2/1990 | Sachtler et al. | 585/482 |
| 4,909,116 | A | 3/1990 | Tanaka et al. | 84/692 |
| 4,918,041 | A | 4/1990 | Hollstein et al. | 502/217 |
| 4,939,110 | A | 7/1990 | Sachtler et al. | 502/66 |
| 4,956,519 | A | 9/1990 | Hollstein et al. | 585/751 |
| 5,019,671 | A | 5/1991 | Hsu et al. | 585/751 |
| 5,026,951 | A | 6/1991 | Schmidt et al. | 585/738 |
| 5,036,035 | A | 7/1991 | Baba et al. | 502/221 |
| 5,036,085 | A | 7/1991 | Heinemann et al. | 514/361 |
| 5,107,052 | A | 4/1992 | McCulloch et al. | 585/738 |
| 5,120,898 | A | 6/1992 | Baba et al. | 585/750 |
| 5,146,035 | A | 9/1992 | Spehlmann et al. | 585/667 |
| 5,146,037 | A | 9/1992 | Zarchy et al. | 585/738 |
| 5,157,199 | A | 10/1992 | Soled et al. | 585/750 |
| 5,182,247 | A | 1/1993 | Kuhlmann et al. | 502/217 |
| 5,212,136 | A | 5/1993 | Angstadt et al. | 502/206 |
| 5,214,017 | A | 5/1993 | Angstadt et al. | 502/204 |
| 5,310,868 | A | 5/1994 | Angstadt et al. | 585/721 |
| 5,321,197 | A | 6/1994 | Angstadt et al. | 585/721 |
| 5,340,465 | A | 8/1994 | Gillespie et al. | 208/191 |
| 5,360,534 | A | 11/1994 | Rice et al. | 208/139 |
| 5,491,278 | A | 2/1996 | Angstadt et al. | 585/731 |
| 5,493,067 | A | 2/1996 | Angstadt et al. | 585/731 |
| 5,629,257 | A | 5/1997 | Umansky et al. | 502/217 |
| 5,744,684 | A | 4/1998 | Zinnen et al. | 585/737 |
| 5,750,459 | A | 5/1998 | Marella et al. | 502/304 |
| 5,762,887 | A | 6/1998 | Girod et al. | 422/200 |
| 5,762,888 | A | 6/1998 | Sechrist | 422/216 |
| 5,768,904 | A | 6/1998 | Tagamolila et al. | 62/238.3 |
| 5,780,383 | A | 7/1998 | Hollstein et al. | 502/324 |
| 5,786,294 | A | 7/1998 | Sachtler et al. | 502/349 |
| 5,802,870 | A | 9/1998 | Arnold et al. | 62/480 |
| 5,831,139 | A | 11/1998 | Schmidt et al. | 585/315 |
| 5,837,641 | A | 11/1998 | Gosling et al. | 502/219 |
| 5,862,060 | A | 1/1999 | Murray, Jr. | 364/528.01 |
| 6,180,556 | B1 | 1/2001 | Marella et al. | 502/217 |
| 6,184,430 | B1 | 2/2001 | Venkatesh et al. | 585/750 |
| 6,214,764 | B1 | 4/2001 | Gillespie | 502/230 |
| 6,320,089 | B1 | 11/2001 | Gillespie | 585/744 |
| 6,359,179 | B1 | 3/2002 | Nemeth et al. | 568/387 |
| 6,448,198 | B1 | 9/2002 | Szabo et al. | 502/217 |
| 6,495,733 | B1 | 12/2002 | Peratello et al. | 585/743 |
| 6,573,417 | B1 | 6/2003 | Rice | 585/738 |
| 6,593,504 | B1 | 7/2003 | Bricker et al. | 585/470 |
| 6,706,659 | B1 | 3/2004 | Gillespie et al. | 502/217 |
| 2004/0067845 | A1 | 4/2004 | Furuta et al. | 502/216 |

ISOMERIZATION PROCESS USING NOVEL CATALYST

CROSS-REFERENCE TO RELATED APPLICATION

This application is a Continuation-In-Part of copending application Ser. No. 10/717,812 and Ser. No. 10/718,050 both filed Nov. 20, 2003 which applications are a Division and a Continuation, respectively, of application Ser. No. 09/942,237 filed Aug. 29, 2001, now U.S. Pat. No. 6,706,659, the contents of which are hereby incorporated by reference in their entirety.

STATEMENT REGARDING FEDERALLY SPONSORED RESEARCH OR DEVELOPMENT

This work was performed under the support of the U.S. Department of Commerce, National Institute of Standards and Technology, Advanced Technology Program, Cooperative Agreement Number 70NANB9H3035. The United States Government has certain rights in this invention.

FIELD OF THE INVENTION

This invention relates generally to the isomerization of hydrocarbons. This invention relates more specifically to the isomerization of light paraffins using a solid catalyst, and optionally the separation of more highly branched paraffins from less highly branched paraffins by fractionation or adsorptive separation.

BACKGROUND OF THE INVENTION

High octane gasoline is required for modern gasoline engines. Formerly it was common to accomplish octane number improvement by the use of various lead-containing additives. As lead was phased out of gasoline for environmental reasons, octane ratings were maintained with other aromatic and low vapor pressure hydrocarbons. Environmental damage caused by the vaporization of low vapor pressure hydrocarbons and the health hazards of benzene in motor fuel will lead to further restrictions on octane blending components. Therefore, it has become increasingly necessary to rearrange the structure of the $C_5$ and $C_6$ hydrocarbons used in gasoline blending in order to obtain high octane levels. Catalytic isomerization is a widely used process for this upgrading.

The traditional gasoline blending pool normally includes $C_4$ and heavier hydrocarbons having boiling points of less than 205° C. (395° F.) at atmospheric pressure. This range of hydrocarbon includes $C_4$–$C_6$ paraffins and especially the $C_5$ and $C_6$ normal paraffins which have relatively low octane numbers. The $C_4$–$C_6$ hydrocarbons have the greatest susceptibility to octane improvement by lead addition and were formerly upgraded in this manner. With eventual phase out of lead additives octane improvement was obtained by using isomerization to rearrange the structure of the paraffinic hydrocarbons into branched-chain paraffins or reforming to convert the $C_6$ and heavier hydrocarbons to aromatic compounds. Normal $C_5$ hydrocarbons are not readily converted into aromatics, therefore, the common practice has been to isomerize these lighter hydrocarbons into corresponding branched-chain isoparaffins. Although the $C_6$ and heavier hydrocarbons can be upgraded into aromatics through hydrocyclization, the conversion of $C_6$'s to aromatics creates higher density species and increases gas yields with both effects leading to a reduction in liquid volume yields. Moreover, the health concerns related to benzene are likely to generate overall restrictions on benzene and possibly aromatics as well, which some view as precursors for benzene tail pipe emissions. Therefore, it is preferred to change the $C_6$ paraffins to an isomerization unit to obtain $C_6$ isoparaffin hydrocarbons. Consequently, octane upgrading commonly uses isomerization to convert $C_6$ and lighter boiling hydrocarbons.

The effluent from an isomerization reaction zone will contain a mixture of more highly branched and less highly branched paraffins. In order to further increase the octane of the products from the isomerization zone, normal paraffins, and sometimes less highly branched isoparaffins, are typically recycled to the isomerization zone along with the feedstream in order to increase the ratio of less highly branched paraffins to more highly branched paraffins entering the isomerization zone. A variety of methods are known to treat the effluent from the isomerization zone for the recovery of normal paraffins and monomethyl-branched isoparaffins for recycling these less highly branched paraffins to the isomerization zone.

Relatively higher octane isomers are commonly separated from lower octane normal paraffins and monomethyl-branched paraffins by using a distillation zone, adsorptive separation or some combination thereof. General arrangements for the separation and recycling of $C_5$ and $C_6$ hydrocarbons in isomerization units are shown and described at pages 5–49 through 5–51 of The Handbook of Petroleum Refining Processes, edited by Robert A. Meyers, published by McGraw Hill Book Company (1986). Distillation is a primary method of recovering the normal paraffins from the higher octane isomers. However, it is difficult to obtain a high octane product with distillative separation due to the boiling points of the various $C_5$ and $C_6$ hydrocarbons. With distillation the high octane dimethylbutanes and isopentanes cannot be economically recovered without also recovering relatively low octane normal pentane. Until recently the absorptive separation processes were mainly used to separate normal paraffins from isoparaffins. Therefore, all isoparaffins were collected in a common extract stream that includes dimethylbutane and isopentanes as well as lower octane monomethylpentanes.

U.S. Pat. No. 2,966,528, discloses a process for the isomerization of $C_6$ hydrocarbons and the adsorptive separation of normal hydrocarbons from branched-chain hydrocarbons. The process adsorbs normal hydrocarbons from the effluent of the isomerization zone and recovers the unadsorbed hydrocarbons as product, desorbs straight-chain hydrocarbons using a normal paraffin desorbent, and returns the desorbent and adsorbed straight-chain hydrocarbons to the isomerization zone.

Many methods of separating normal paraffins from isoparaffins use adsorptive separation under liquid phase conditions. In such methods, the isomerization effluent contacts a solid adsorbent having a selectivity for normal paraffins to effect the selective adsorption of normal paraffins and allow recovery of the isoparaffins as a high octane product. Contacting the normal paraffin containing adsorbent with the desorbent material in a desorption step removes normal paraffins from the adsorbent for recycle to the isomerization zone. Both the isoparaffin and normal paraffin containing streams undergo a separation for the recovery of desorbent before the isoparaffins are recovered as a product and the normal paraffins recycled to the isomerization zone. Liquid phase adsorption has been carried out in conventional swing bed systems as shown in U.S. Pat. No. 2,966,528. The use of simulated moving bed systems for the selective adsorption of normal paraffins is also known and disclosed by U.S. Pat. No. 3,755,144. Simulated moving bed systems have the advantage of increasing recovery and purity of the adsorbed and non-adsorbed components in the isomerization zone effluent for a given unit of adsorbent material.

Adsorption processes using vapor phase adsorption for the separation of normal and branched paraffins are also well known. Examples of such processes are described in U.S. Pat. No. 3,175,444, U.S. Pat. No. 4,709,116, and U.S. Pat. No. 4,709,117. These references teach the use of multiple adsorbent vessels and the steps of adsorbing and desorbing the normal paraffins from an isomerization zone effluent. In addition, one or more steps of blowdown or void space purging are also taught to increase the recovery of product hydrocarbons.

Recent efforts in adsorptive separation teach adsorbents and flow schemes for also separating monomethyl paraffins from dimethyl-branched paraffins. U.S. Pat. Nos. 4,717,784 and U.S. Pat. No. 4,804,802 disclose processes for the isomerization of a hydrocarbon feed and the use of multiple adsorptive separations to generate normal paraffin and monomethyl-branched paraffin recycle streams. In such systems the effluent from the isomerization zone enters a molecular sieve separation zone that contains a 5 A-type sieve and a ferrierite-type sieve that adsorb normal paraffins and monomethyl-branched paraffins, respectively. U.S. Pat. No. 4,804,802 discloses steam or hydrogen as the desorbent for desorbing the normal paraffins and monomethyl-branched paraffins from the adsorption section and teaches that steam or hydrogen may be recycled with the normal paraffins or monomethyl-branched paraffins to the isomerization zone.

Another method of recovering the high octane isomers from lower octane isomers and normal paraffins uses adsorptive separation followed by distillation. U.S. Pat. No. 3,755,144 shows a process for the isomerization of a pentane/hexane feed and the separation of normal paraffins from the isomerization zone effluent. The isomerization zone effluent is separated by a molecular sieve separation zone that includes facilities for the recovery of desorbent from the normal paraffin containing stream that is recycled to the isomerization zone. An extract stream that contains isoparaffins is sent to a deisohexanizer column that separates isopentane and dimethylbutane as a product stream and provides a recycle stream of isohexane that is returned to the isomerization zone.

The present invention performs an isomerization process using a novel catalyst. The catalyst is a solid acid catalyst comprising a support comprising a sulfated oxide or hydroxide of at least an element of Group IVB (IUPAC 4) of the Periodic Table, a first component selected from the group consisting of at least one lanthanide-series element, mixtures thereof, and yttrium, and a second component selected from the group of platinum-group metals and mixtures thereof. In one embodiment of the invention, the atomic ratio of the first component to the second component is at least about 2. In another embodiment of the invention, the catalyst further comprises from about 2 to 50 mass-% of a refractory inorganic-oxide binder.

SUMMARY OF THE INVENTION

The invention is a process for the isomerization of a feedstream comprising $C_5$–$C_6$ hydrocarbons where the process involves charging hydrogen and a feedstream comprising at least normal $C_5$–$C_6$ hydrocarbons into an isomerization zone and contacting said hydrogen and feedstream with an isomerization catalyst at isomerization conditions to increase the branching of the feedstream hydrocarbons and produce an isomerization effluent stream comprising at least normal pentane, normal hexane, methylbutane, dimethylbutane, and methylpentane. The catalyst is a solid acid catalyst comprising a support comprising a sulfated oxide or hydroxide of at least an element of Group IVB (IUPAC 4) of the Periodic Table, a first component selected from the group consisting of at least one lanthanide-series element, mixtures thereof, and yttrium, and a second component selected from the group of platinum-group metals and mixtures thereof.

The atomic ratio of the first component of the catalyst to the second component of the catalyst may be at least about 2, and the catalyst may further comprise from about 2 to 50 mass-% of a refractory inorganic-oxide binder. The first component of the catalyst may be selected from the group consisting of lutetium, ytterbium, thulium, erbium, holmium, terbium, combinations thereof, and yttrium. The catalyst may further comprise a third component selected from the group consisting of iron, cobalt, nickel, rhenium, and mixtures thereof.

The process may further comprising passing the isomerization effluent stream to a product separator to separate a hydrogen-rich stream from an isomerized product stream, and the isomerized product stream may be passed to a stabilizer to separate a $C_4$ and lighter stream from a $C_5$–$C_6$-rich stream. The $C_5$–$C_6$-rich stream may be passed to a deisohexanizer to separate a methyl-pentane and normal hexane rich stream and recycle the methyl-pentane and normal hexane rich stream to the isomerization zone, or the $C_5$–$C_6$-rich stream may be passed to an adsorptive separation zone to separate a methyl-pentane and normal hexane rich stream and recycle the methyl-pentane and normal hexane rich stream to the isomerization zone.

DETAILED DESCRIPTION OF THE INVENTION

Figure 1:
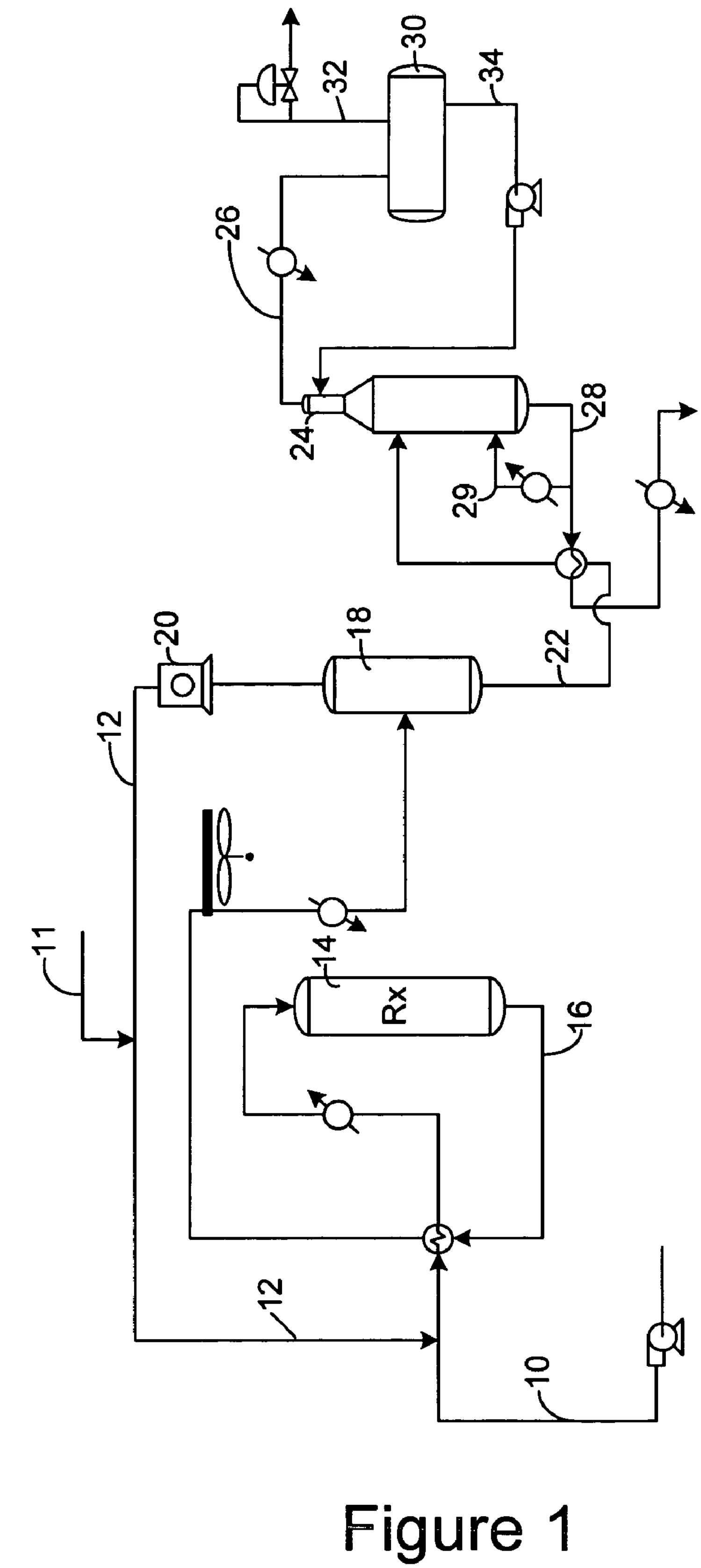
FIG. 1 is a schematic drawing of the process of this invention.

Applicants have discovered that the octane numbers of $C_5$ and $C_6$ hydrocarbons can be significantly improved in an isomerization process through the use of a novel catalyst. Optionally, lower octane methylpentanes, normal hexane and normal pentane may be recycled to increase the octane number even further. In general, a feedstock is contacted with a novel isomerization catalyst in an isomerization zone. The effluent from the isomerization zone passes first to a product separator, with the bottoms of the product separator being conducted to a stabilizer. The bottoms of the stabilizer may be collected as a high octane gasoline blending component, or may be further separated to recover and recycle a normal alkane recycle stream. The normal alkanes may be recovered using an adsorptive separation zone, or a deisohexanizer.

Accordingly in one embodiment, this invention is a process for the isomerization of a feedstream that comprises $C_5$–$C_6$ hydrocarbons. The process charges a combined feedstream comprising normal $C_5$ and $C_6$ hydrocarbons into an isomerization zone and contacts the feedstream with an isomerization catalyst at isomerization conditions and thereby increases the branching of the feedstream hydrocarbons and produces an isomerization zone effluent stream that comprises normal pentane, normal hexane, methylbutane, dimethylbutane and methylpentane.

Other aspects of this invention relate to particular process operations and arrangements. For example, in one aspect, the isomerization zone effluent is passed directly to a stabilizer, $C_4$ and lighter hydrocarbons are removed from the effluent and the remainder of the effluent is passed directly to the selective adsorption zone. In another aspect of this invention, the feedstream contains methylcyclopentane and cyclohexane and the deisohexanizer zone is operated such that the sidecut stream and the bottoms stream contains cyclohexane.

The feedstocks that can be used in this invention include hydrocarbon fractions rich in $C_4$–$C_6$ normal paraffins. The term "rich" is defined to mean a stream having more than 50% of the mentioned component. Preferred feedstocks are substantially pure normal paraffin streams having from 4 to 6 carbon atoms or a mixture of such substantially pure normal paraffins. Other useful feedstocks include light natural gasoline, light straight run naphtha, gas oil condensate, light raffinates, light reformate, light hydrocarbons, field butanes, and straight run distillates having distillation end points of about 77° C. (170° F.) and containing substantial quantities of $C_4$–$C_6$ paraffins. The feed stream may also contain low concentrations of unsaturated hydrocarbons and hydrocarbons having more than 6 carbon atoms.

Hydrogen is admixed with the feed in an amount that will provide a hydrogen to hydrocarbon ratio equal to or less than 0.05 in the effluent from the isomerization zone. The hydrogen to hydrocarbon ratio of 0.05 or less at the effluent has been found to provide sufficient excess hydrogen for operation of the process. Although no net hydrogen is consumed in the isomerization reaction, the isomerization zone will have a net consumption of hydrogen often referred to as the stoichiometric hydrogen requirement which is associated with a number of side reactions that occur. These side reactions include cracking and disproportionation. Other reactors that will also consume hydrogen include olefin and aromatics saturation. For feeds having a low level of unsaturates, satisfying the stoichiometric hydrogen requirements demand a hydrogen to hydrocarbon molar ratio for the inlet stream of between 0.05 to 5.0. Hydrogen in excess of the stoichiometric amounts for the side reactions is maintained in the reaction zone to provide good stability and conversion by compensating for variations in feed stream compositions that alter the stoichiometric hydrogen requirements.

When the hydrogen to hydrocarbon ratio exceeds 0.05, it is not economically desirable to operate the isomerization process without the recycle of hydrogen to the isomerization zone. As the quantity of hydrogen leaving the product recovery section increases, additional amounts of $C_4$ and other product hydrocarbons are taken by the fuel gas stream from the product recovery section. The value of the lost product or the additional expense associated with recovery facilities to prevent the loss of product do not justify operating the process without recycle at hydrogen to hydrocarbon ratios above 0.05.

Hydrogen may be added to the feed mixture in any manner that provides the necessary control for the addition of small hydrogen quantities. Metering and monitoring devices for this purpose are well known by those skilled in the art. As currently practiced, a control valve is used to meter the addition of hydrogen to the feed mixture. The hydrogen concentration in the outlet stream or one of the outlet stream fractions is monitored by a hydrogen monitor and the control valve setting position is adjusted to maintain the desired hydrogen concentration. The hydrogen concentration at the effluent is calculated on the basis of total effluent flow rates.

The hydrogen and hydrocarbon feed mixture is contacted in the reaction zone with a novel isomerization catalyst. The novel isomerization catalyst comprises a sulfated support of an oxide or hydroxide of a Group IVB (IUPAC 4) metal, preferably zirconium oxide or hydroxide, at least a first component which is a lanthanide element or yttrium component, and at least a second component being a platinum-group metal component. Preferably, the first component contains at least ytterbium and the second component is platinum. The catalyst optionally contains an inorganic-oxide binder, especially alumina. The catalyst is fully described in U.S. Pat. No. 6,706,659 which is hereby incorporated by reference in its entirety.

The support material of the catalyst of the present invention comprises an oxide or hydroxide of a Group IVB (IUPAC 4). In one embodiment the Group IVB element is zirconium or titanium. Sulfate is composited on the support material. A component of a lanthanide-series element is incorporated into the composite by any suitable means. A platinum-group metal component is added to the catalytic composite by any means known in the art to effect the catalyst of the invention, e.g., by impregnation. Optionally, the catalyst is bound with a refractory inorganic oxide. The support, sulfate, metal components and optional binder may be composited in any order effective to prepare a catalyst useful for the isomerization of hydrocarbons.

Production of the support of the present catalyst is described in U.S. Pat. No. 6,706,659 and not reproduced here. A sulfated support is prepared by treatment with a suitable sulfating agent to form a solid strong acid. Sulfate ion is incorporated into a catalytic composite, for example, by treatment with sulfuric acid in a concentration usually of about 0.01–10N and preferably from about 0.1–5N. Compounds such as hydrogen sulfide, mercaptans or sulfur dioxide, which are capable of forming sulfate ions upon calcining, may be employed as alternative sources. Ammonium sulfate may be employed to provide sulfate ions and form a solid strong acid catalyst. The sulfur content of the finished catalyst generally is in the range of about 0.5 to 5 mass-%, and preferably is from about 1 to 2.5 mass-%. The sulfated composite is dried, preferably followed by calcination at a temperature of about 500 to 800° C. particularly if the sulfation is to be followed by incorporation of the platinum-group metal.

A first component, comprising one or more of the lanthanide-series elements, yttrium, or mixtures thereof, is another essential component of the present catalyst. Included in the lanthanide series are lanthanum, cerium, praseodymium, neodymium, promethium, samarium, europium, gadolinium, terbium, dysprosium, holmium, erbium, thulium, ytterbium and lutetium. Preferred lanthanide series elements include lutetium, ytterbium, thulium, erbium, holmium, terbium, and mixtures thereof. Ytterbium is a most preferred component of the present catalyst. The first component may in general be present in the catalytic composite in any catalytically available form such as the elemental metal, a compound such as the oxide, hydroxide, halide, oxyhalide, carbonate or nitrate or in chemical combination with one or more of the other ingredients of the catalyst. The first component is preferably an oxide, an intermetallic with platinum, a sulfate, or in the zirconium lattice. The materials are generally calcined between 600 and 800° C. and thus in the oxide form. The lanthanide element or yttrium component can be incorporated into the catalyst in any amount which is catalytically effective, suitably from about 0.01 to about 10 mass-% lanthanide or yttrium, or mixtures, in the catalyst on an elemental basis. Best results usually are achieved with about 0.5 to about 5 mass-% lanthanide or yttrium, calculated on an elemental basis. The preferred atomic ratio of lanthanide or yttrium to platinum-group metal for this catalyst is at least about 1:1, preferably about 2:1 or greater, and especially about 5:1 or greater.

The first component is incorporated in the catalytic composite in any suitable manner known to the art, such as by coprecipitation, coextrusion with the porous carrier material, or impregnation of the porous carrier material either before, after, or simultaneously with sulfate though not necessarily with equivalent results.

A second component, a platinum-group metal, is an essential ingredient of the catalyst. The second component comprises at least one of platinum, palladium, ruthenium, rhodium, iridium, or osmium; platinum is preferred, and it is especially preferred that the platinum-group metal consists essentially of platinum. The platinum-group metal component may exist within the final catalytic composite as a compound such as an oxide, sulfide, halide, oxyhalide, etc., in chemical combination with one or more of the other ingredients of the composite or as the metal. Amounts in the range of from about 0.01 to about 2-wt. % platinum-group metal component, on an elemental basis, are preferred. Best results are obtained when substantially all of the platinum-group metal is present in the elemental state.

The second component, a platinum-group metal component, is deposited on the composite using the same means as for the first component described above. Illustrative of the decomposable compounds of the platinum group metals are chloroplatinic acid, ammonium chloroplatinate, bromoplatinic acid, dinitrodiamino platinum, sodium tetranitroplatinate, rhodium trichoride, hexa-amminerhodium chloride, rhodium carbonylchloride, sodium hexanitrorhodate, chloropalladic acid, palladium chloride, palladium nitrate, diamminepalladium hydroxide, tetraamminepalladium chloride, hexachloroiridate (IV) acid, hexachloroiridate (III) acid, ammonium hexachloroiridate (III), ammonium aquohexachloroiridate (IV), ruthenium tetrachloride, hexachlororuthenate, hexa-ammineruthenium chloride, osmium trichloride and ammonium osmium chloride. The second component, a platinum-group component, is deposited on the support either before, after, or simultaneously with sulfate and/or the first component though not necessarily with equivalent results. It is preferred that the platinum-group component is deposited on the support either after or simultaneously with sulfate and/or the first component.

In addition to the first and second components above, the catalyst may optionally further include a third component of iron, cobalt, nickel, rhenium or mixtures thereof. Iron is preferred, and the iron may be present in amounts ranging from about 0.1 to about 5-wt. % on an elemental basis. The third component, such as iron, may function to lower the amount of the first component, such as ytterbium, needed in the optimal formulation. The third component may be deposited on the composite using the same means as for the first and second components as described above. When the third component is iron, suitable compounds would include iron nitrate, iron halides, iron sulfate and any other soluble iron compound.

The catalytic composite described above can be used as a powder or can be formed into any desired shapes such as pills, cakes, extrudates, powders, granules, spheres, etc., and they may be utilized in any particular size. The composite is formed into the particular shape by means well known in the art. In making the various shapes, it may be desirable to mix the composite with a binder. However, it must be emphasized that the catalyst may be made and successfully used without a binder. The binder, when employed, usually comprises from about 0.1 to 50 mass-%, preferably from about 5 to 20 mass-%, of the finished catalyst. The art teaches that any refractory inorganic oxide binder is suitable. One or more of silica, alumina, silica-alumina, magnesia and mixtures thereof are suitable binder materials of the present invention. A preferred binder material is alumina, with eta-and/or especially gamma-alumina being favored. Examples of binders which can be used include but are not limited to alumina, silica, silica-alumina and mixtures thereof. Usually the composite and optional binder are mixed along with a peptizing agent such as HCl, $HNO_3$, KOH, etc. to form a homogeneous mixture which is formed into a desired shape by forming means well known in the art. These forming means include extrusion, spray drying, oil dropping, marumarizing, conical screw mixing, etc. Extrusion means include screw extruders and extrusion presses. The forming means will determine how much water, if any, is added to the mixture. Thus, if extrusion is used, then the mixture should be in the form of a dough, whereas if spray drying or oil dropping is used, then enough water needs to be present in order to form a slurry. These particles are calcined at a temperature of about 260° C. to about 650° C. for a period of about 0.5 to about 2 hours.

The catalytic composites of the present invention either as synthesized or after calcination can be used as catalysts in the present invention. Calcination is required to form zirconium oxide from zirconium hydroxide.

Figure 6:
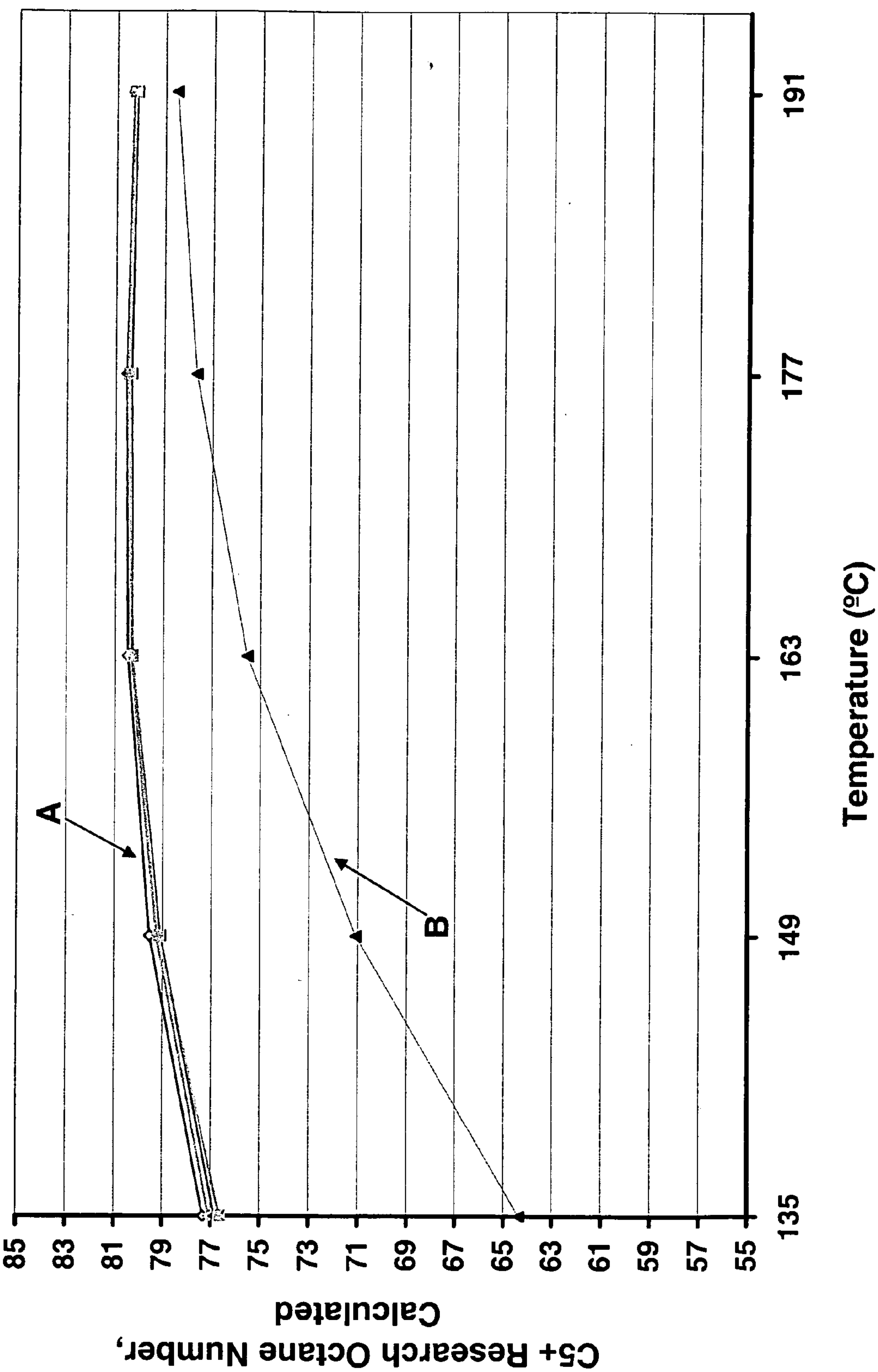
FIG. 6 is a plot of the octane number of the isomerized product streams versus temperature for an isomerization process using an available sulfated zirconia catalyst as compared to that of the present invention.
Figure 7:
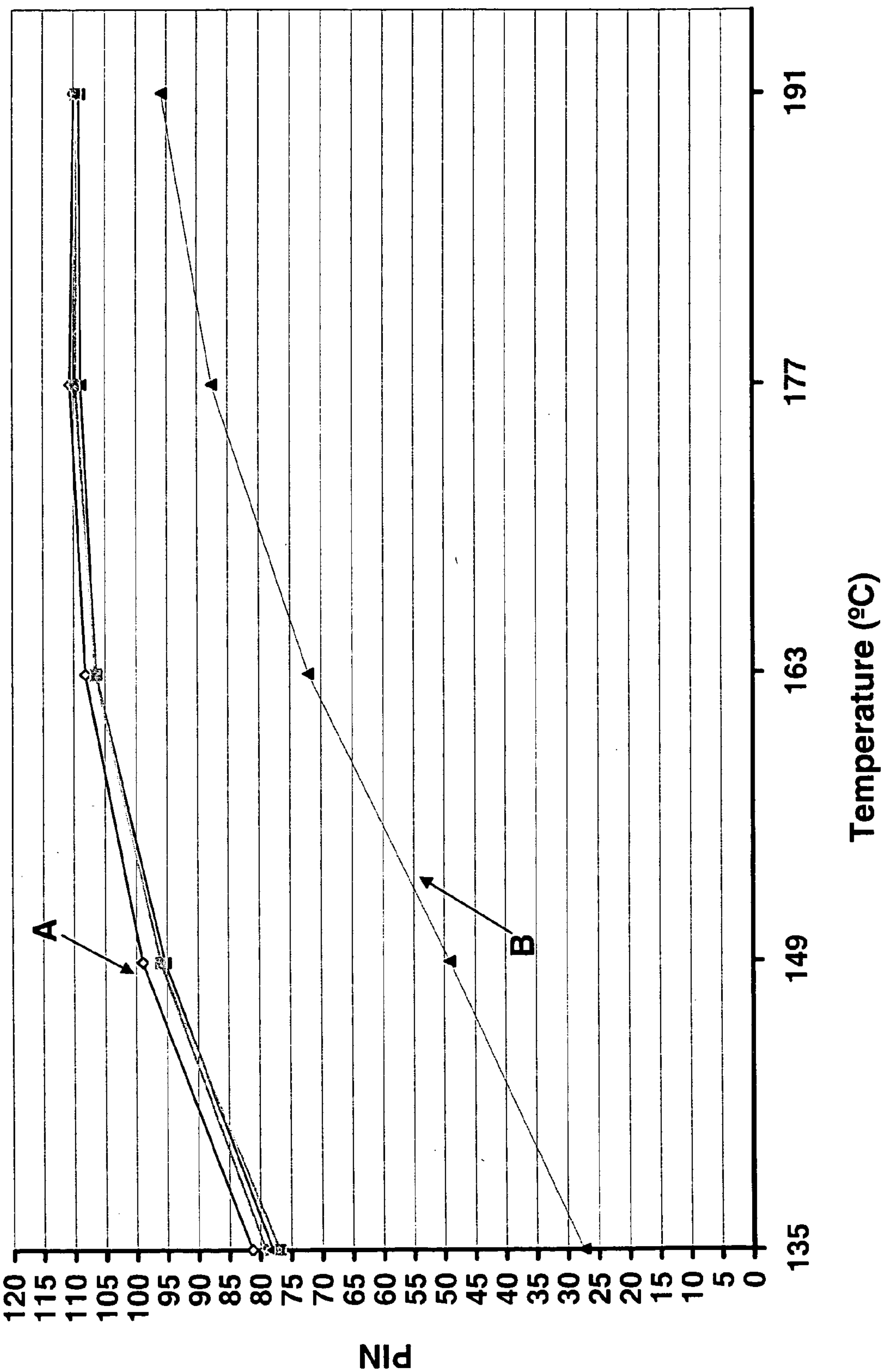
FIG. 7 is a plot of the percent isoparaffins in the product stream versus temperature for an isomerization process using an available sulfated zirconia catalyst as compared to that of the present invention.

One unexpected benefit of the present invention is the dramatic increase in the high octane components of the product. The example and FIG. 6 show a comparison of the research octane number of the product stream generated using the present invention (repeated experiments) with that generated using an available sulfated zirconia catalyst as described in U.S. Pat. No. 5,036,085 and U.S. Pat. No. 5,120,898 hereby incorporated by reference in their entirety. The increase in highly valued products is partially explained by the increased ability of the catalyst of the present invention to convert normal paraffins into isoparaffins. The example and FIG. 7 show that the normal paraffin compounds that are converted to isoparaffin compounds using the present invention is substantially greater than that generated using an available sulfated zirconia catalyst. FIG. 7 shows the paraffin isomerization number (PIN) of the product stream as plotted versus temperature. The PIN number is a measure of the amount of iso-$C_5$ paraffin and the highest octane $C_6$ paraffins in a stream. The PIN is calculated as follows:

$$PIN = \text{wt \% } i\text{-}C_5/(\text{wt \% } C_5 \text{ paraffins}) + \text{wt \% 22DMB} + \text{wt \%23DMB})/(\text{wt \% } C_6 \text{ paraffins})$$

Where i-$C_5$ is isopentane, 22DMB is 2,2-dimethylbutane, and 23DMB is 2,3-dimethylbutane.

Figure 8:
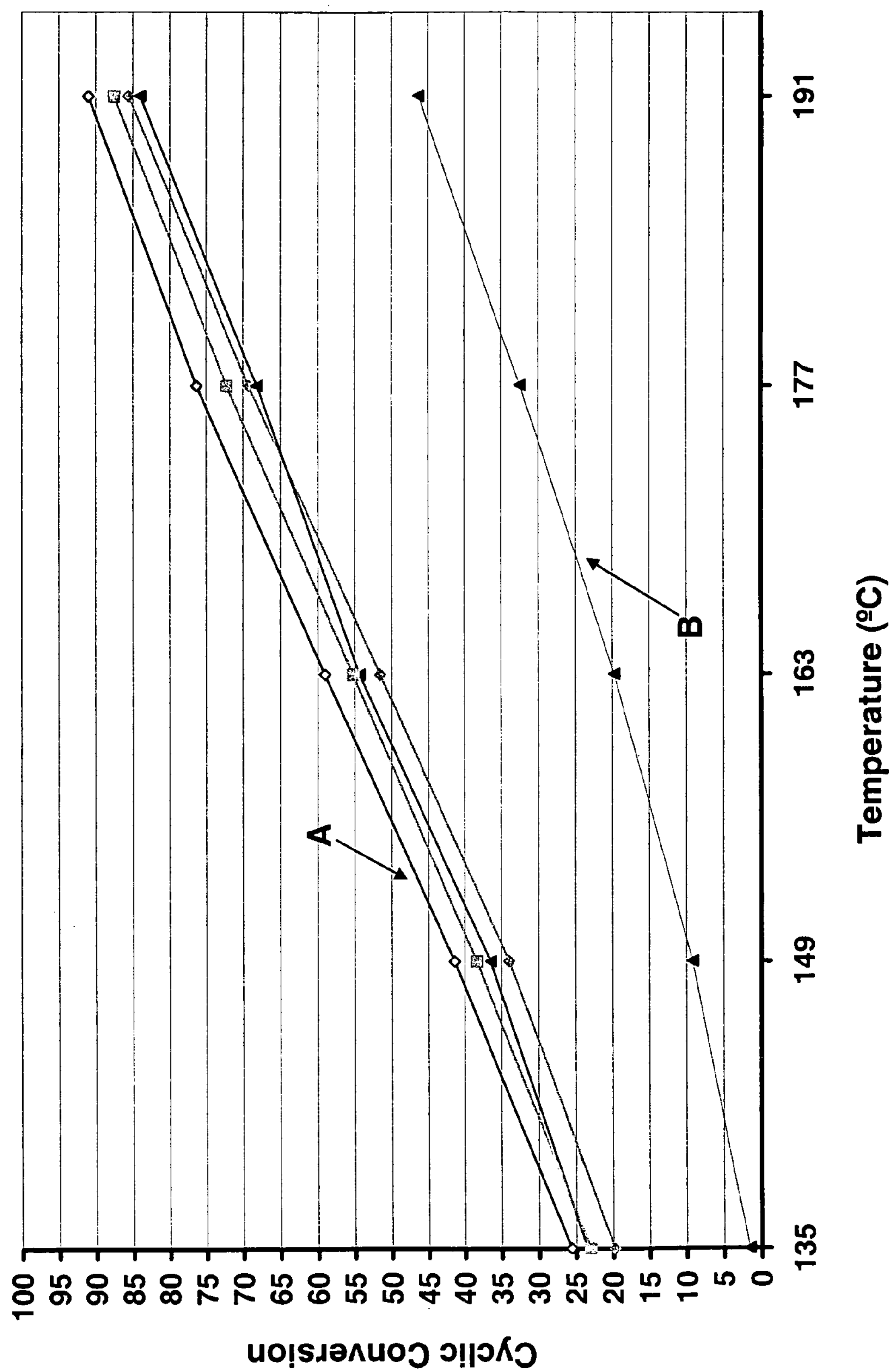
FIG. 8 is a plot of the percent of cyclic components converted to non-cyclic components versus temperature for an isomerization process using an available sulfated zirconia catalyst as compared to that of the present invention.

However, one unexpected and non-obvious result of using this novel catalyst is that a substantially greater amount of cyclic components are converted to paraffins. These paraffins are subsequently isomerized to the high octane, high value, products. This unexpected benefit results in a more valuable product as compared to isomerization processes using other catalysts. FIG. 8 shows the cyclic component conversion ability of the catalyst used in the present invention as compared to an available sulfated zirconia isomerization catalyst. The catalyst of the current invention converts significantly more cyclic compounds than the available sulfated zirconia catalyst.

Another unexpected benefit of using this novel catalyst in the isomerization process is the sulfur and water tolerance of the catalyst. Other isomerization catalysts are generally known to be highly sensitive to sulfur and oxygen-containing compounds, thereby requiring that the feedstock be relatively free of such compounds. A sulfur concentration no greater than 0.5 ppm is generally required. With other catalysts, the presence of sulfur in the feedstock serves to temporarily deactivate the catalyst by platinum poisoning. Also, with other catalysts, water can act to permanently deactivate the catalyst. Therefore, in other systems, water, as well as oxygenates, in particular $C_1$–$C_5$ oxygenates, that can decompose to form water, can only be tolerated in very low concentrations. Feedstocks would have to be treated by any method that would remove water and sulfur compounds. For example, sulfur may be removed from the feed stream by hydrotreating and a variety of commercial dryers are available to remove water from the feed components. Adsorption processes for the removal of sulfur and water from hydrocarbon streams are also well known to those skilled in the art. However, due to the sulfur and water tolerance of the catalyst of the present invention, it is less likely that such feedstock treatments would be required. The elimination of feedstock treatment equipment results in a reduction in capital needed to construct the units and an ongoing reduction in the operating costs. Furthermore, costs associated with corrosion and emission control commonly encountered in some other isomerization processes are eliminated thereby making the present invention more economical.

Operating conditions within the isomerization zone are selected to maximize the production of isoalkane product from the feed components. Temperatures within the reaction zone will usually range from about 40°–235° C. (100°–455° F.). Lower reaction temperatures are generally preferred since they usually favor equilibrium mixtures of isoalkanes versus normal alkanes. Lower temperatures are particularly useful in processing feeds composed of $C_5$ and $C_6$ alkanes where the lower temperatures favor equilibrium mixtures having the highest concentration of the most branched isoalkanes. When the feed mixture is primarily $C_5$ and $C_6$ alkanes temperatures in the range of from 60° to 160° C. are preferred. Thus, when the feed mixture contains significant portions of $C_4$–$C_6$ alkanes most suitable operating temperatures are in the range from 145° to 225° C. The reaction zone may be maintained over a wide range of pressures. Pressure conditions in the isomerization of $C_4$–$C_6$ paraffins range from 7 barsg to 70 barsg. Preferred pressures for this process are in the range of from 20 barsg to 30 barsg. The feed rate to the reaction zone can also vary over a wide range. These conditions include liquid hourly space velocities ranging from 0.5 to 12 $hr^{-1}$ however, space velocities between 1 and 6 $hr^{-1}$ are preferred.

The invention is described with reference to FIG. 1. Reference to the specific arrangement for this invention is not meant to limit it to the details disclosed therein. Furthermore, FIG. 1 is a schematic illustration and does not show a number of details for the process arrangement such as pumps, compressors, valves, stabilizers and recycle lines which are well known to those skilled in the art.

FIG. 1 shows three primary operating zones, an isomerization zone, a product separator zone, and a stabilizer zone. Fresh feed of the type previously described is introduced via line 10 to the isomerization zone 14 which contains the isomerization catalyst. The isomerization zone is operated at conditions previously discussed. Hydrogen in line 12 is admixed with the feed to the isomerization zone in an amount that will provide a hydrogen to hydrocarbon molar ratio of from 0.05 to 5.0 in the effluent from the isomerization zone. If necessary, make-up gas can be provided through line 11.

The isomerization zone 14 is shown as a single reactor system. The invention is not restricted to a particular type of isomerization zone. The isomerization zone can consist of any type of isomerization zone that takes a stream of $C_5$–$C_6$ straight-chain hydrocarbons or a mixture of straight-chain and branched-chain hydrocarbons and converts straight-chain hydrocarbons in the feed mixture to branched-chain hydrocarbons and branched hydrocarbons to more highly branched hydrocarbons thereby producing an effluent having branched-chain and straight-chain hydrocarbons. A two-reactor system with a first stage reactor and a second stage reactor in the reaction zone is an alternative embodiment. For a two reactor system, the catalyst used is distributed between the two reactors in any reasonable distribution. It is not necessary that the reaction be carried out in two reactors but the use of two reactors confer several benefits on the process. The use of two reactors and specialized valving allows partial replacement of the catalyst system without taking the isomerization unit off stream. For the short periods of time during which replacement of catalyst may be necessary, the entire flow of reactants may be processed through only one reaction vessel while catalyst is replaced in the other. The use of two reaction zones also aids in maintaining lower catalyst temperatures. This is accomplished by having any exothermic reaction such as hydrogenation of unsaturates performed in the first vessel with the rest of the reaction carried out in a final reactor stage at more favorable temperature conditions. For example, the relatively cold hydrogen and hydrocarbon feed mixtures are passed through a cold feed exchanger that heats the incoming feed against the effluent from the final reactor. The feed from the cold feed exchanger is carried to the hot feed exchanger where the feed is heated against the effluent carried from the first reactor. The partially heated feed from hot feed exchanger is carried through an inlet exchanger that supplies any additional heat requirements for the feed and then into a first reactor. Effluent from the first reactor is carried to the second reactor after passage through an exchanger to provide inter-stage cooling. The isomerization zone effluent is carried from second reactor through the cold feed exchanger as previously described and into the separation facilities.

The effluent from the isomerization zone 16 enters a product separator that divides the reaction zone effluent into a product stream 22 comprising $C_4$ and heavier hydrocarbons, and an overhead gas stream 12 which is made up of lighter hydrocarbons, $C_3$ and lighter boiling compounds, and hydrogen. Conditions for the operation of the product separator include pressures ranging from 100 to 600 psig. Specific embodiments utilize pressures from 200 to about 500 psig. Suitable designs for rectification columns and separator vessels are well known to those skilled in the art. The stabilizer column may optionally include a reboiler loop 29 from which the $C_4$+ products stream is withdrawn. The products stream 22 may pass through a product exchanger that heats the reactor effluent before it enters the product separator. Cooled product may be recovered from the exchanger. The hydrogen-rich gas stream is carried in line 12 from the product separator and is recycled using recycle compressor 20 to combine with feedstock in line 10.

The remainder of the isomerization zone effluent is conducted in line 22 to stabilizer 24 that removes light gases and butane from the effluent via line 26. The amount of butane taken off from the stabilizer will vary depending upon the amount of butane entering the process. The stabilizer normally runs at a pressure of from 800 to 1700 Kpaa. The bottoms stream 28 from the stabilizer provides an isomerization zone effluent stream comprising $C_5$ and higher boiling hydrocarbons that include normal paraffins for recycle and branched isomerized products. The bottoms stream 28 may be heat exchanged with the products stream 22 from the product separator. $C_4$ and lighter hydrocarbons are taken overhead by line 26 and passed through overhead receiver 30 which separates reflux stream 34 which is recycled to the stabilizer 24 and offgas stream 32 which may be recovered for further processing or fuel gas use.

Figure 2:
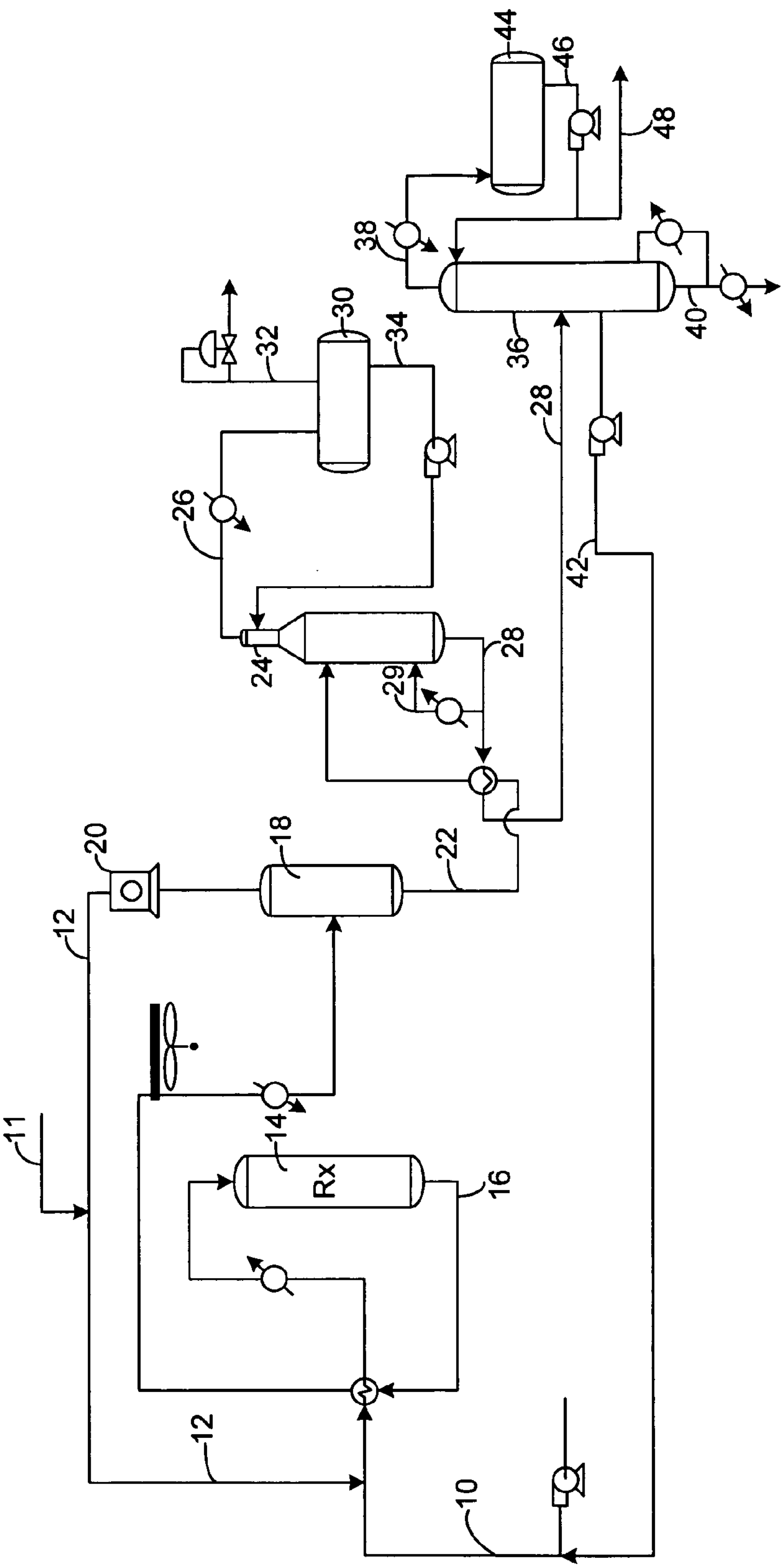
FIG. 2 is a schematic drawing of the process of this invention including the optional deisohexanizer.
Figure 4:
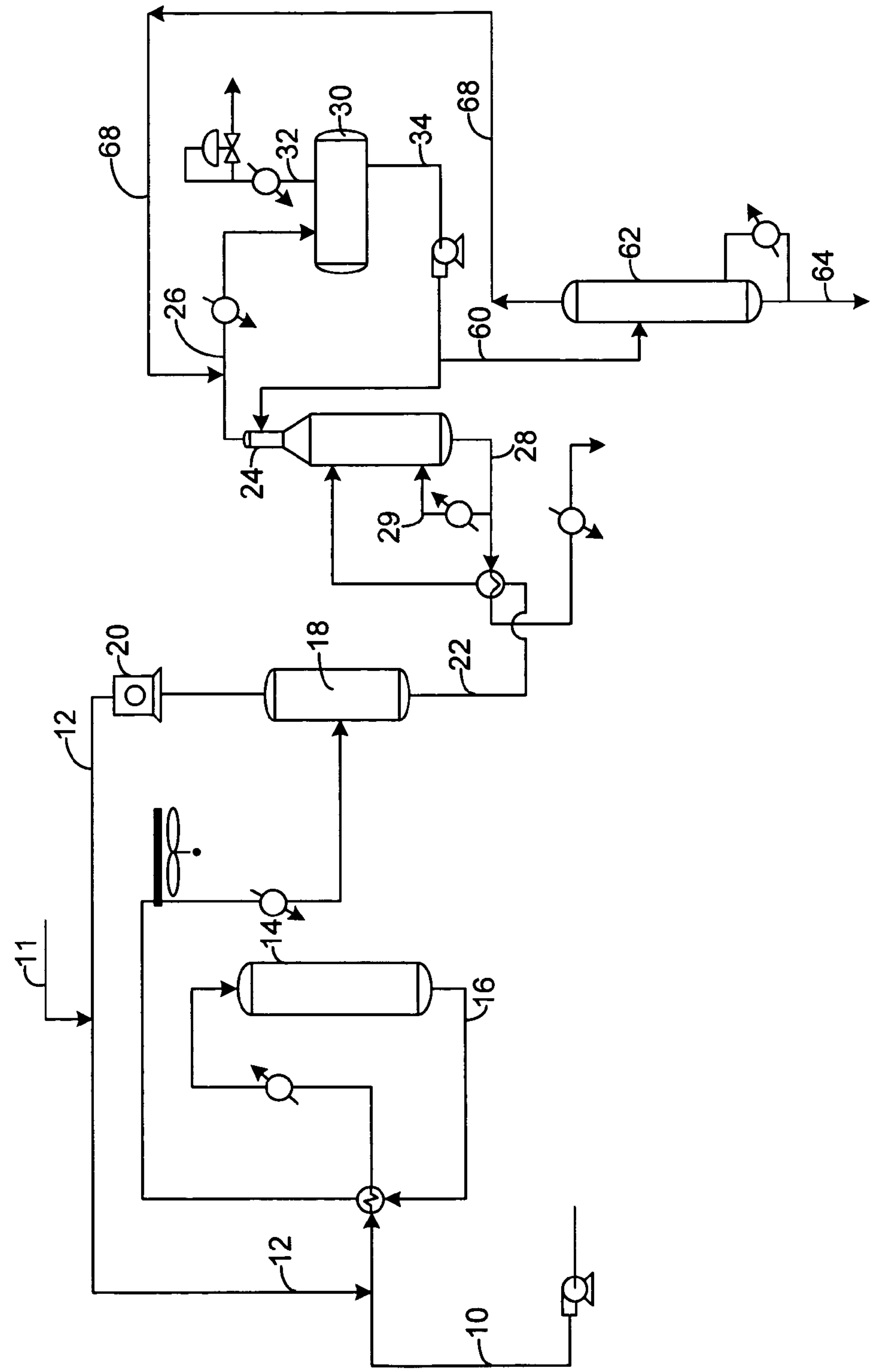
FIG. 4 is a schematic drawing of the process of this invention including the optional LPG recovery section where the LPG recovery section employs an LPG stripper.
Figure 5:
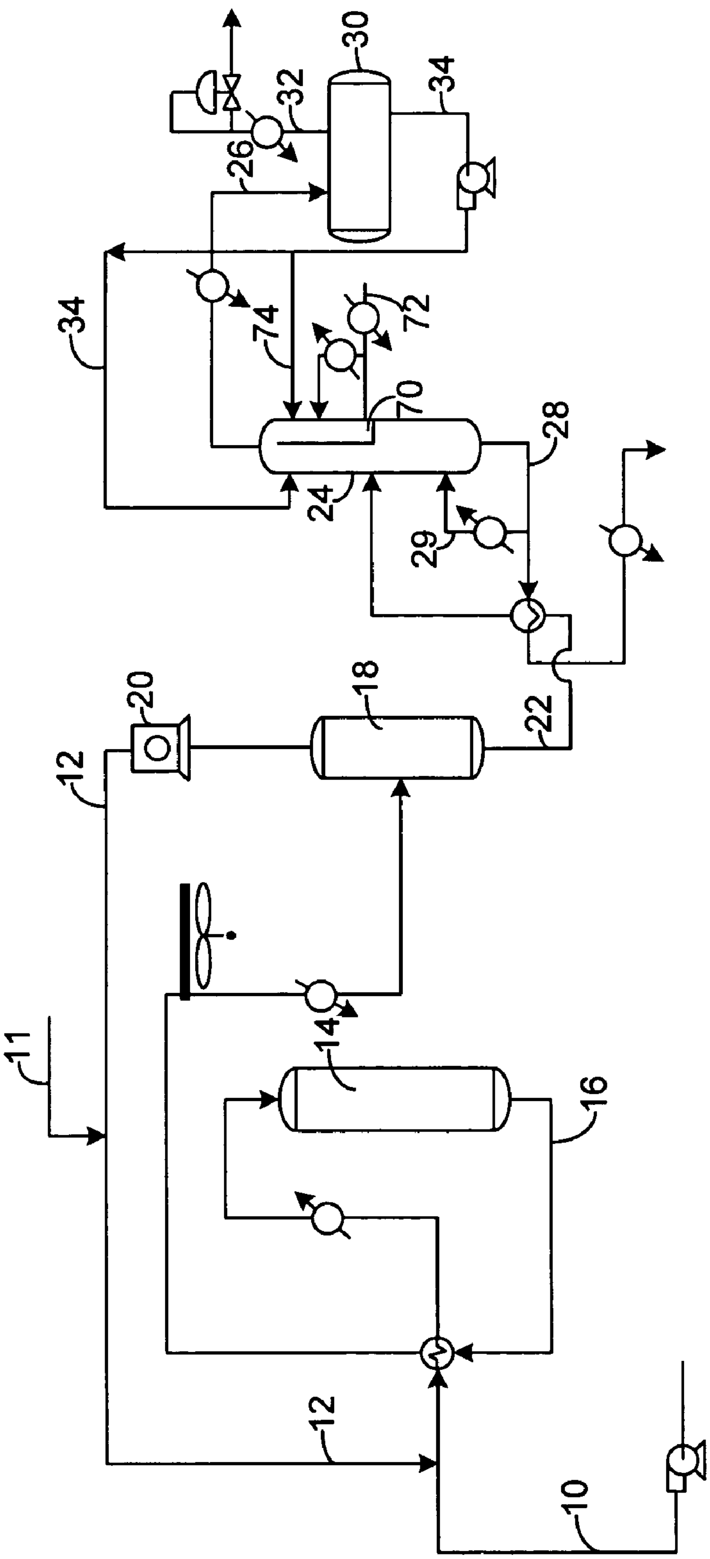
FIG. 5 is a schematic drawing of the process of this invention including the optional LPG recovery section where the LPG recovery section employs a stabilizer with an integrated LPG zone.

In some applications, LPG may be a desired product. Typically an LPG product may consist largely of propane and butane. FIGS. 4 and 5 show two embodiments of the invention where an LPG product may be obtained. In FIG. 4, a portion of the reflux stream 34 is conducted in line 60 to LPG stripper 62. LPG stripper 62 separates the stream in line 60 into an LPG product stream 64 containing largely propane and butanes and an LPG stripper overhead stream 68 which is recycled to combine with the stabilizer overhead line 26. Alternatively, the LPG stripper and the stabilizer may be combined into a single unit using, for example, dividing wall technology. As shown in FIG. 5, stabilizer 24 has LPG zone 70 where an LPG product stream 72 is withdrawn. A portion of reflux stream 34 is conducted via line 74 to LPG zone 70 of stabilizer 24. The remained of reflux stream 34 is conducted to stabilizer 24. The LPG recovery techniques may also be used in those embodiments involving additional separation of the stabilizer bottoms stream 28, especially as depicted in FIG. 2 where stabilizer bottoms stream 28 is fractionated in deisohexanizer 36. It is emphasized that the LPG recovery embodiments described in FIGS. 4 and 5 are merely optional and do not limit the overall scope of the invention.

Figure 3:
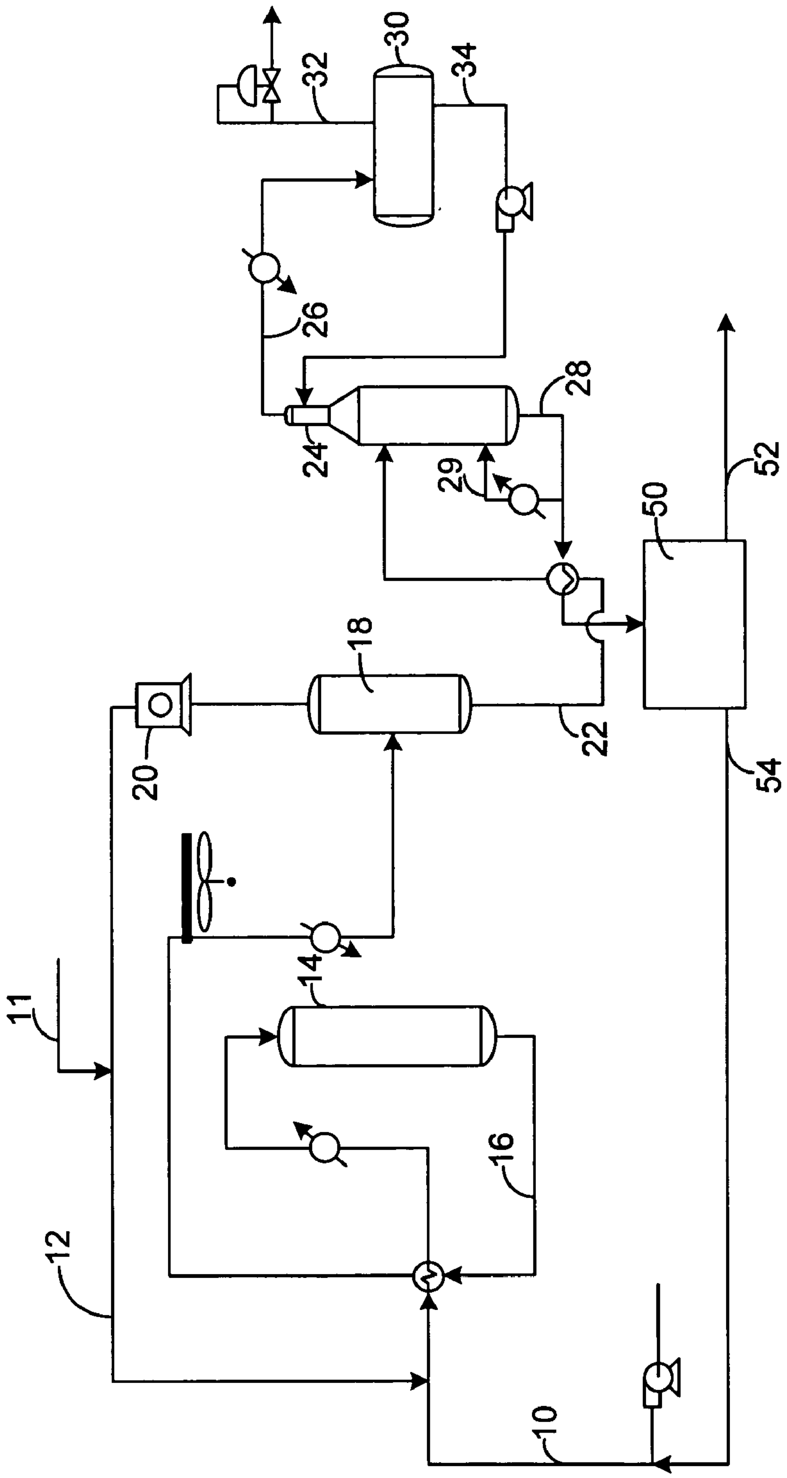
FIG. 3 is a schematic drawing of the process of this invention including the optional adsorptive separation zone.

Product may be collected at this point and used in, for example, gasoline blending. Alternatively, the separation section may also include different types of facilities for recovery and recycle of at least normal alkanes in order to increase the overall conversion to higher octane products. Monomethylpentanes may also be recovered and recycled with the normal alkanes. Examples of facilities for the recovery of at least normal alkanes are shown in FIGS. 2 and 3 and discussed below.

Turning now to FIG. 2, stabilizer bottoms stream 28 is passed to a deisohexanizer zone 36. The deisohexanizer zone 36 serves a variety of purposes. It provides an overhead stream 38 that contains a high concentration of normal pentane, methylbutane and dimethylbutanes. The deisohexanizer zone also provides a $C_6$ recycle stream 42 that comprises normal hexane and monomethylpentanes. These relatively lower octane hydrocarbons can be recovered from the deisohexanizer zone 36 in any manner. Preferably the $C_6$ recycle stream 42 exits as a sidecut from a single deisohexanizer column 36. In the operation of a fractionation zone having the arrangement of deisohexanizer 36, the cut point for the sidecut stream 42 is below the boiling point of 2,3-dimethylbutane and above the boiling point of 2-methylpentane. 2,3-Dimethylbutane has the higher octane of the dimethylbutane isomers and 2-methylpentane has a relatively low octane number, lower than 3-methylpentane. As a result, a good split between the sidecut 42 and the overhead 38 is desired to maximize octane. Since only a narrow boiling point difference separates 2,3-dimethylbutane and 2-methylpentane, the deisohexanizer is designed to maximize this separation.

The lower cut point for the deisohexanizer zone 36 is particularly important to the operation of this process. It should be set low enough to recycle essentially all of the methylpentane and normal hexane to the isomerization zone 14. Preferably, the deisohexanizer column 36 will operate with a lower cut point set at about the boiling point of cyclohexane. With a cyclohexane cut point a substantial portion of cyclohexane and all methylcyclopentane will be recycled to the isomerization zone.

Heavier hydrocarbons are withdrawn from the distillation zone as a heavy hydrocarbon stream 40. For the single column deisohexanizer 36, this heavy hydrocarbon stream is withdrawn by a line 40. Where a full boiling range naphtha is used as the feed to the process, the heavy hydrocarbon feed will comprise a $C_7$+naphtha. This bottoms stream will ordinarily be used as the feed in a reforming zone. A cyclohexane cut point between the sidecut and heavy hydrocarbon stream introduce substantial portions of any cyclohexane into the heavy hydrocarbon stream. Such an operation will maximize the production of aromatics from a downstream reforming zone.

Turing now to FIG. 3, one embodiment of the invention uses an adsorptive separation zone to separate and recycle $C_6$ normal and monomethyl-alkanes. A number of different adsorption processes will separate normal pentane from other $C_5$ and $C_6$ isoparaffins. For use in this process, the adsorption system should operate to efficiently recover the normal pentane at relatively low cost. A low cost system is possible since the normal pentane recycle stream does not require a high purity. Apart from the additional throughput, the recycle of additional dimethylbutanes has no adverse impact on the process. The adsorption sections is preferably vapor phase and can utilize any type of well known adsorption process such as a swing bed, simulated moving bed, or other schemes for contacting the adsorbent with the feed mixture and desorbing the feed mixture from the adsorbent with the desorbent material. A simulated moving bed type adsorption system has been found to be most useful for this process. The adsorptive separation section provides the low purity normal pentane stream which is combined with the recycle stream and a fresh feed to form a combined feed that enters the isomerization zone. A product stream comprising methylbutane and dimethylbutanes are recovered as the raffinate or non-adsorbed components from the adsorptive separation zone.

In FIG. 3, the remainder of the isomerization zone effluent comprising 2,3-dimethylbutane and lower boiling hydrocarbons in stream 28 is taken from the stabilizer column and transferred to the adsorptive separation section 50. The adsorption section 50 of this invention is operated to primarily remove the normal pentane fraction from the effluent of the isomerization zone which is returned to the isomerization zone by line 54. The isomerization zone products are recovered from the adsorptive separation section 50 by line 52.

Virtually any adsorbent material that has capacity for the selective adsorption of either isoparaffin or the normal paraffin components can be used in the adsorptive separation section. Suitable adsorbents known in the art and commercially available include crystalline molecular sieves, activated carbons, activated clays, silica gels, activated aluminas and the like. The molecular sieves include, for example, the various forms of silicoaluminophosohates and aluminophosphates disclosed in U.S. Pat. No. 4,440,871; U.S. Pat. No. 4,310,440 and U.S. Pat. No. 4,567,027, hereby incorporated by reference, as well as zeolitic molecular sieves. Zeolitic molecular sieves in the calcined form may be represented by the general formula; $Me_{2/n}O:Al_2O_3:xSiO:yH_2O$, where Me is a cation, x has a value from about 2 to infinity, n is the cation valence and y has a value of from about 2 to 10.

Typical well-known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicate disclosed in U.S. Pat. No. 4,073,865, hereby incorporated by reference. Detailed descriptions of some of the above-identified zeolites may be found in D. W. Breck, Zeolite Molecular Sieves, John Wiley and Sons, New York, 1974, hereby incorporated by reference. Preferred adsorbents for the PSA type adsorption section include a type 5 A molecular sieve in the form of ⅛ pellets. The selection of other adsorbents for normal hydrocarbon separation can be made by one skilled in the art with routine experimentation. This invention is further described in the context of an adsorbent that preferably absorbs normal paraffin's and rejects isoparaffins such as a type 5A molecular sieve.

Additional adsorbents capable of selectively adsorbing the di-branched paraffins and rejecting both monomethyl paraffins and normal paraffins are aluminophosphates from the group comprising SAPO-5, $AIPO_4$-5, and MAPSO-5, and MgAPO-5 and SSZ-24 (an all-silica molecular sieve that is isostructural with $AIPO_4$-5). SAPO-5 is a silicoaluminophosphate whose method of manufacture, structure and properties are disclosed in U.S. Pat. No. 4,440,871. $AIPO_4$-5 is an aluminophosphate having a pore size of 8 .ANG. and may be made by the method disclosed in U.S. Pat. No. 4,310,440. MgAPO-5 is a metalloaluminophosphate having the structural formula, properties and method of manufacture disclosed in U.S. Pat. No. 4,567,029. As described in U.S. Pat. No. 4,310,440, MAPSO-5 is a metallosilica aluminophosphate in which the metal is magnesium and whose structural formula, properties and method of manufacture are disclosed in U.S. Pat. No. 4,758,419. SSZ-24 is isostructural with $AIPO_4$-5 and is described in U.S. Pat. No. 4,834,958.

Typically, adsorbents used in separation processes, such as described herein, contain the crystalline material dispersed in an amorphous inorganic matrix or binder, having channels and cavities therein which enable liquid access to the crystalline material. Although there are a variety of synthetic and naturally occurring binder materials available such as metal oxides, clays, silicas, aluminas, silica-aluminas, silica-zirconias, silica thorias, silica-berylias, silica-titanias, silica-aluminas-thorias, silica-alumina-zirconias, mixtures of these and the like, clay-type binders are preferred. Examples of clays which may be employed to agglomerate the molecular sieve without substantially altering the adsorptive properties of the zeolite are attapulgite, kaolin, volclay, sepiolite, polygorskite, kaolinite, bentonite, montmorillonite, illite and chlorite. The binder, typically in amounts ranging from 2–25% by weight, aids in forming or agglomerating the crystalline particles of the zeolite which otherwise would comprise a fine powder. The adsorbent may thus be in the form of particles such as extrudates, aggregates, tablets, macrospheres or granules having a desired particle size range, from about 16 to 40 mesh (Standard U.S. Mesh) (1.9 mm to 230 .mu.m). The choice of a suitable binder and methods employed to agglomerate the molecular sieves are generally known to those skilled in the art.

In the moving bed or simulated moving bed processes, the retention and displacement operations are continuously taking place which allows both continuous production of an extract and a raffinate stream and the continuous use of feed and displacement fluid streams. The operating principles and sequence of the simulated moving bed countercurrent flow system are described in U.S. Pat. No. 2,985,589 incorporated herein by reference in its entirety. In such a system, it is the progressive movement of multiple liquid access points down a adsorbent chamber that simulates the upward movement of adsorbent contained in the chamber.

A number of specially defined terms are used in describing the simulated moving bed processes. The term “feed stream” indicates a stream in the process through which feed material passes to the adsorbent. A feed material comprises one or more extract components and one or more raffinate components. An “extract component” is a compound or type of compound that is more selectively retained by the adsorbent while a “raffinate component” is a compound or type of compound that is less selectively retained. In this process, di-branched hydrocarbons from the feed stream are extract components while feed stream normal and mono-branched hydrocarbons are raffinate components. The term “displacement fluid” or “desorbent” shall mean generally a material capable of displacing an extract component. The term “desorbent input stream” indicates the stream through which desorbent passes to the molecular sieve. The term “raffinate output stream” means a stream through which most of the raffinate components are removed from the molecular sieve. The composition of the raffinate stream can vary from about 100% desorbent to essentially 100% raffinate components. The term “extract stream” or “extract output stream” shall mean a stream through which an extract material which has been displaced by desorbent is removed from the molecular sieve. The composition of the extract stream can also vary from about 100% desorbent to essentially 100% extract components.

The term “selective pore volume” of the adsorbent is defined as the volume of the adsorbent which selectively retains extract components from the feedstock. The term "non-selective void volume" of the adsorbent is the volume of the adsorbent which does not selectively retain extract components from the feedstock. This volume includes the cavities of the adsorbent which are capable of retaining raffinate components and the interstitial void spaces between adsorbent particles. The selective pore volume and the non-selective void volume are generally expressed in volumetric quantities and are of importance in determining the proper flow rates of fluid required to be passed into an operational zone for efficient operations to take place for a given quantity of molecular sieve.

When adsorbent "passes" into an operational zone (hereinafter defined and described) its non-selective void volume together with its selective pore volume carries fluid into that zone. The non-selective void volume is utilized in determining the amount of fluid which should pass into the same zone in a countercurrent direction to the adsorbent to displace the fluid present in the non-selective void volume. If the fluid flow rate passing into a zone is smaller than the non-selective void volume rate of adsorbent material passing into that zone, there is a net entrainment of liquid into the zone by the molecular sieve. Since this net entrainment is a fluid present in a non-selective void volume of the molecular sieve, it, in most instances, comprises less selectively retained feed components.

In a preferred simulated moving bed process only four of the access lines are active at any one time: the feed input stream, desorbent inlet stream, raffinate outlet stream, and extract outlet stream access lines. Coincident with this simulated upward movement of the solid adsorbent is the movement of the liquid occupying the void volume of the packed bed of molecular sieve. So that countercurrent contact is maintained, a liquid flow down the adsorbent chamber may be provided by a pump. As an active liquid access point moves through a cycle, that is, from the top of the chamber to the bottom, the chamber circulation pump moves through different zones which require different flow rates. A programmed flow controller may be provided to set and regulate these flow rates.

The active liquid access points effectively divide the adsorbent chamber into separate zones, each of which has a different function. In this embodiment of the process, it is generally necessary that three separate operational zones be present in order for the process to take place although in some instances an optional fourth zone may be used.

The adsorption zone, zone I, is defined as the adsorbent located between the feed inlet stream and the raffinate outlet stream. In this zone, the feedstock contacts the molecular sieve, an extract component is retained, and a raffinate stream is withdrawn. Since the general flow through zone I is from the feed stream which passes into the zone to the raffinate stream which passes out of the zone, the flow in this zone is considered to be a downstream direction when proceeding from the feed inlet to the raffinate outlet streams.

Immediately upstream with respect to fluid flow in adsorption zone I is the purification zone II. The purification zone II is defined as the adsorbent between the extract outlet stream and the feed inlet stream. The basic operations taking place in zone II are the displacement from the non-selective void volume of the adsorbent of any raffinate material carried into zone II by the shifting of adsorbent into this zone and the displacement of any raffinate material retained within the selective pore volume of the molecular sieve. Purification is achieved by passing a portion of extract stream material leaving zone II into zone II at zone II is upstream boundary to effect the displacement of raffinate material The flow of liquid in zone II is in a downstream direction from the extract outlet stream to the feed inlet stream.

Immediately upstream of zone II with respect to the fluid flowing in zone II is the desorption zone III. The desorption zone III is defined as the adsorbent between the desorbent inlet and the extract outlet streams. The function of the desorption zone is to allow a desorbent which passes into this zone to displace the extract component which was retained in the adsorbent during a previous contact with feed in zone I in a prior cycle of operation. The flow of fluid in zone III is essentially in the same direction as that of zones I and II.

In some instances, an optional buffer zone, zone IV, may be utilized. This zone, defined as the adsorbent between the raffinate outlet stream and the desorbent inlet stream, if used, is located immediately upstream with respect to the fluid flow to zone III. Zone IV would be utilized to conserve the amount of desorbent utilized in the desorption step since a portion of the raffinate stream which is removed from zone I can be passed into zone IV to displace desorbent present in that zone out of the zone into the desorption zone. Zone IV will contain enough desorbent so that raffinate material present in the raffinate stream passing out of zone I and into zone IV can be prevented from passing into zone Im thereby contaminating extract stream removed from zone III. In the instances in which the fourth operational zone is not utilized, the raffinate stream passed from zone I to zone IV must be carefully monitored in order that the flow directly from zone I to zone III can be stopped when there is an appreciable quantity of raffinate material present in the raffinate stream passing from zone I into zone III so that the extract outlet stream is not contaminated.

A cyclic advancement of the input and output streams through the fixed bed of adsorbent can be accomplished by utilizing a manifold system in which the valves in the manifold are operated in a sequential manner to effect the shifting of the input and output streams thereby allowing a flow of fluid with respect to solid adsorbent in a countercurrent manner. Another mode of operation which can effect the countercurrent flow of solid adsorbent with respect to fluid involves the use of a rotating disc valve in which the input and output streams are connected to the valve and the lines through which feed input, extract output, desorbent input and raffinate output streams pass are advanced in the same direction through the adsorbent bed. Both the manifold arrangement and disc valve are known in the art. Specifically, rotary disc valves which can be utilized in this operation can be found in U.S. Pat. No. 3,040,777 and U.S. Pat. No. 3,422,848, incorporated herein by reference. Both of the aforementioned patents disclose a rotary type connection valve in which the suitable advancement of the various input and output streams from fixed sources can be achieved without difficulty.

In many instances, one operational zone will contain a much larger quantity of adsorbent than some other operational zone. For instance, in some operations, the buffer zone can contain a minor amount of adsorbent as compared to the adsorbent required for the adsorption and purification zones. It can also be seen that in instances in which desorbent is used which can easily displace extract material from the adsorbent that a relatively small amount of adsorbent will be needed in the desorption zone as compared to the adsorbent needed in the adsorption zone or purification zone. Since it is not required that the adsorbent be located in a single column, the use of multiple chambers or a series of columns is within the scope of the invention.

It is not necessary that all of the input or output streams be simultaneously used, and, in fact, in many instances some of the streams can be shut off while others effect an input or output of material. The apparatus which can be utilized to effect the process of this invention can also contain a series of individual beds connected by connecting conduits upon which are placed input or output taps to which the various input or output streams can be attached and alternately and periodically shifted to effect continuous operation. In some instances, the connecting conduits can be connected to transfer taps which during the normal operations do not function as a conduit through which material passes into or out of the process.

In the typical operation of this process, at least a portion of the raffinate output stream and a portion of the extract output stream will be passed to a separation means wherein at least a portion of the desorbent can be separated to produce a desorbent stream which can be reused in the process and raffinate and extract products containing a reduced concentration of desorbent. The separation means will typically be a fractionation column, the design and operation of which is well known to the separation art.

Although both liquid and vapor phase operations can be used in many adsorptive type separation processes, liquid-phase operation is preferred for this process because of the lower temperature requirements and because of the higher yields of extract product that can be obtained with liquid-phase operation over those obtained with vapor-phase operation. Adsorption conditions will, therefore, include a pressure sufficient to maintain liquid phase. Adsorption conditions will include a temperature range of from about 60° C. to about 200° C., with about 100° C. to about 180° C. being preferred and a pressure sufficient to maintain liquid-phase, ranging from about atmospheric to about 500 psig with from about atmospheric to about 200 psig usually being adequate. Desorption conditions will include the same range of temperatures and pressures as used for adsorption conditions.

The desorbent must be selected to satisfy the following criteria: First, the desorbent material should displace an extract component from the adsorbent with reasonable mass flow rates without itself being so strongly adsorbed in the following adsorption cycle. Secondly, the desorbent material must be compatible with the particular adsorbent and the particular feed mixture. More specifically, it must not reduce or destroy the critical selectivity of the adsorbent for an extract component with respect to a raffinate component. The desorbent should additionally be easily separable from the feed mixture that is passed into the process. Both the raffinate stream and the extract stream are removed from the adsorbent in admixture with desorbent material and without a method of separating at least a portion of the desorbent material, the purity of the extract product and the raffinate product would not be vary high nor would the desorbent material be available for reuse in the process. It is, therefore, contemplated that any desorbent material used in this process will preferably have a substantially different average boiling point than that of the feed mixture, i.e., more than about 5° C. difference, to allow separation of at least a portion of desorbent material from feed components in the extract and raffinate streams by simple fractional distillation, thereby permitting reuse of desorbent material in the process. Finally, desorbent materials should also be materials which are readily available and reasonable in cost. In the preferred isothermal, isobaric, liquid-phase operation of the process of the invention, $C_4$ to $C_{10}$ n-paraffins, e.g., n-hexane, n-heptane and n-decane, and especially n-butane are preferred as the desorbent material.

EXAMPLE

A comparison between the process of the present invention and an isomerization process using an available sulfated zirconia catalyst was conducted using pilot plants. The pilot plants were equipped with a reactor and a gas chromatograph. The catalysts used included a catalyst containing 2.7 wt. % ytterbium, about 0.3 wt. % platinum, and 4.6 wt. % sulfate and a reference sulfated zirconia catalyst as described in U.S. Pat. No. 5,036,085 and U.S. Pat. No. 5,120,898 for comparison. Approximately 10.5 g of each sample was loaded into a multi-unit reactor assay. The catalysts were pretreated in air at 450° C. for 2–6 hours and reduced at 200° C. in hydrogen for 14 hours. Hydrogen and a feed stream containing 34 wt. % n-pentane, 55 wt. % n-hexane, 9.2 wt. % cyclohexane and methylcyclopentane and 1.8 wt. % n-heptane was passed over the catalysts at 135° C., 149° C., 163° C., 177° C. and 191° C., at approximately 250 psig, and 2.0 $hr^{-1}$ WHSV. The hydrogen to hydrocarbon molar ratio was 1.3. The products were analyzed using online gas chromatographs and the percent conversion to high-value products and of cyclohexane was determined at the different temperatures.

The results are shown in FIGS. 6, 7, and 8 showing (1) an increase in the research octane value of the product stream, (2) an increase in the amount of iso-paraffins in the product stream, and (3) that a significant amount of cyclic compounds were converted to noncyclic compounds, likely through ring opening followed by isomerization, thereby demonstrating the unexpected results of the platinum and ytterbium on sulfated zirconia catalyst used in the present invention as compared to an available sulfated zirconia catalyst.

Turning to FIG. 6 the curves labeled A represent data collected in experiments using the novel catalyst of the present invention while the curve labeled B represents data collected in the experiment using the available sulfated zirconia catalyst. The research octane number of the product streams were plotted versus time. It is clear from the plot that the research octane number of the present invention is significantly higher than that achieved using the available sulfated zirconia catalyst.

Turning to FIG. 7, again the curves labeled A represent data collected in experiments using the novel catalyst of the present invention while the curve labeled B represents data collected in the experiment using the available sulfated zirconia catalyst. The PIN (as defined above) is plotted versus temperature. It is clear that the present invention provides a significantly high PIN, indicating a greater amount of isoparaffin products, as compared to that achieved using the available sulfated zirconia catalyst.

FIG. 8 shows one unexpected result of the present invention. As with FIGS. 6 and 7, in FIG. 8 the curves labeled A represent data collected in experiments using the novel catalyst of the present invention while the curve labeled B represents data collected in the experiment using the available sulfated zirconia catalyst. The amount of cyclic components that are converted to non-cyclic components, most likely though ring opening, are plotted versus the temperature. It is clear that the present invention provides for a greater degree of cyclic components being converted to non-cyclic components than that achieved when using the available sulfated zirconia catalyst.

What is claimed is:

1. A process for the isomerization of a feedstream comprising $C_5$–$C_6$ hydrocarbons said process comprising charging hydrogen and a feedstream comprising at least normal $C_5$–$C_6$ hydrocarbons into an isomerization zone and contacting said hydrogen and feedstream with an isomerization catalyst at isomerization conditions to increase the branching of the feedstream hydrocarbons and produce an isomerization effluent stream comprising at least normal pentane, normal hexane, methylbutane, dimethylbutane, and methylpentane; wherein said catalyst is a solid acid catalyst comprising a support comprising a sulfated oxide or hydroxide of at least an element of Group IVB (IUPAC 4) of the Periodic Table, a first component selected from the group consisting of at least one lanthanide series element mixtures thereof, and yttrium, and a second components selected from the group consisting of platinum group metals and mixtures thereof.

2. The process of claim 1 wherein the atomic ratio of the first component to the second component is at least about 2.

3. The process of claim 1 wherein the catalyst further comprises from about 2 to about 50 mass-% of a refractory inorganic-oxide binder.

4. The process of claim 1 wherein the first component is selected from the group consisting of lutetium, ytterbium, thulium, erbium, holmium, terbium, combinations thereof and yttrium.

5. The process of claim 1 wherein the first component is ytterbium.

6. The process of claim 1 wherein the catalyst further comprises a third component selected from the group consisting of iron, cobalt, nickel, rhenium, and mixtures thereof.

7. The process of claim 1 further comprising passing the isomerization effluent stream to a product separator to separate a hydrogen rich stream from an isomerized product stream.

8. The process of claim 7 further comprising passing the isomerized product stream to a stabilizer to separate a $C_4$ and lighter stream from a $C_5$–$C_6$-rich stream.

9. The process of claim 8 further comprising passing the $C_5$–$C_6$-rich stream to a deisohexanizer to separate a methyl-pentane and normal hexane-rich stream and recycle the methyl-pentane and normal hexane-rich stream to the isomerization zone.

10. The process of claim 9 wherein the deisohexanizer comprises a single fractionation column and said methyl-pentane and normal hexane-rich stream is withdrawn as a sidecut stream.

11. The process of claim 9 wherein the $C_5$–$C_6$-rich stream enters the deisohexanizer through an intermediate column elevation through a first inlet point and the methyl-pentane and normal hexane-rich stream is withdrawn at a point located below the first inlet point.

12. The process of claim 9 wherein the deisohexanizer also separates an overhead stream comprising methylbutane, normal pentane, and dimethylbutane, and a bottoms stream comprising cyclohexane and higher boiling hydrocarbons.

13. The process of claim 8 further comprising passing the $C_5$–$C_6$-rich stream to an adsorptive separation zone to separate a methyl-pentane and normal hexane-rich stream and recycle the methyl-pentane and normal hexane-rich stream to the isomerization zone.

14. The process of claim 13 wherein said adsorptive separation zone is operated under vapor phase or liquid phase conditions.

15. The process of claim 13 wherein said adsorptive separation zone comprises at least four operationally distinct beds of adsorbent and said beds are operated in a simulated moving bed mode.

16. The process of claim 1 wherein said isomerization effluent stream is blended into a gasoline pool to produce a motor fuel.

17. The process of claim 1 wherein said feedstream includes $C_7$ and higher boiling hydrocarbons.

18. The process of claim 1 wherein said isomerization effluent is passed directly to a stabilizer where $C_4$ and lighter hydrocarbons are removed from said effluent and the remainder of the effluent is passed directly to said deisohexanizer column.

19. The process of claim 8 further comprising separating the $C_4$ and lighter stream into at least an LPG product stream.

20. The process of claim 1 wherein said reaction zone includes a series of two reactors, the feed stream first enters a reactor operating at a temperature in the range of 120° to 225° C. and said effluent is recovered from a reactor operating at a temperature in the range of 60° to 160° C.

* * * * *